B. T. LANE.
PITMAN.
APPLICATION FILED AUG. 19, 1913.
1,179,194.
Patented Apr. 11, 1916.
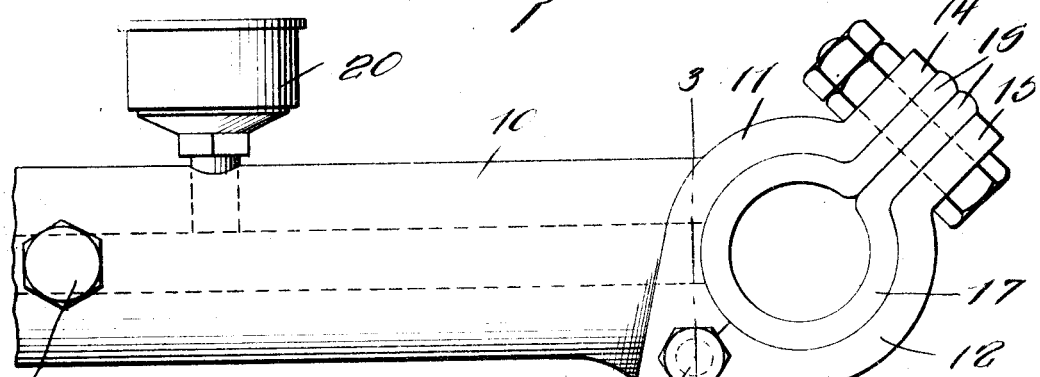
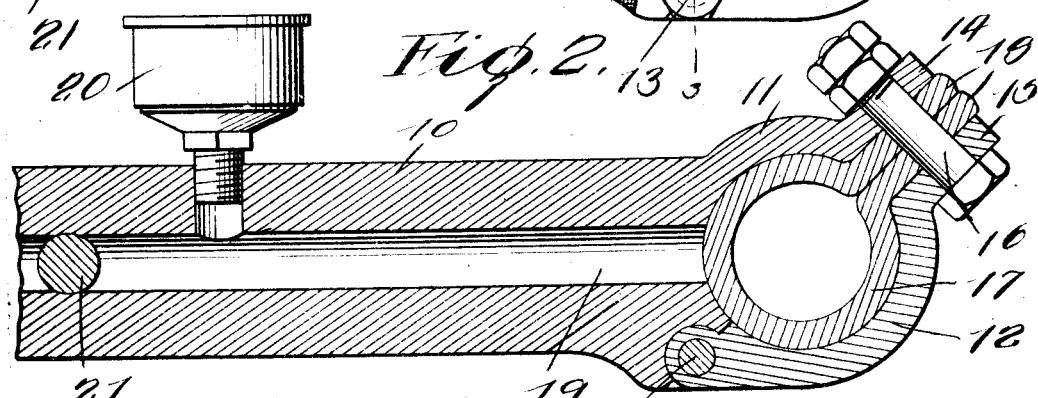
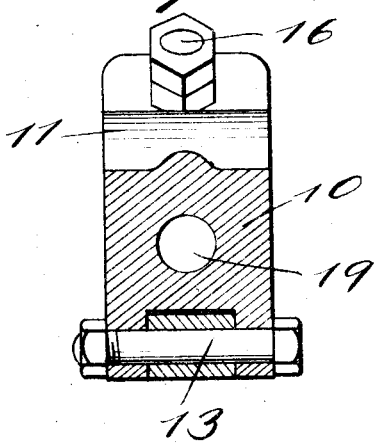
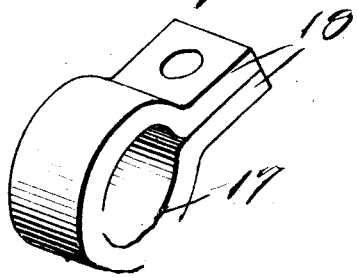
Inventor
B T Lane

UNITED STATES PATENT OFFICE.

BENJAMIN T. LANE, OF BAIRD, WASHINGTON, ASSIGNOR OF ONE-HALF TO LILLIAN L. LANE, OF SEATTLE, WASHINGTON.

PITMAN.

1,179,194. Specification of Letters Patent. Patented Apr. 11, 1916.

Application filed August 19, 1913. Serial No. 785,509.

*To all whom it may concern:*

Be it known that I, BENJAMIN T. LANE, a citizen of the United States, residing at Baird, in the county of Douglas, State of Washington, have invented certain new and useful Improvements in Pitmen; and I do hereby declare the following to be a full, clear, and exact description of the invention, such as will enable others skilled in the art to which it appertains to make and use the same.

This invention relates to pitmen designed especially for use in connection with mowers or other desired machinery and has for an object to provide an extremely simple pitman having a leather bushing for the wrist pin, whereby wear may be easily taken up, and also such leather bushing protecting the wrist pin from the usual annoying wear.

A still further object is to provide a pitman having means for lubricating the bushing, and also having means for taking up wear upon the bushing.

A still further object is to provide an extremely simple, strong and durable pitman that will be formed of a few parts that will not easily get out of order.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention:—Figure 1 is a side elevation of the pitman. Fig. 2 is a longitudinal sectional view through the pitman. Fig. 3 is a cross sectional view on the line 3—3 of Fig. 1. Fig. 4 is a detail perspective view of the bushing.

Referring now to the drawing in which like characters of reference designate similar parts, 10 designates a pitman having a headbearing including an integral member 11 and a member 12 hinged to the member 11 by a pin 13, there being clamp lips 14 and 15 on the integral member and the hinged member respectively through which clamp lips a clamp bolt 16 is passed for drawing the lips together to take up wear upon the bushing. The bushing 17 is formed of leather and is in the nature of a split ring adapted to snugly fit in the inclosure of the bearing and having parallel lips 18 adapted to be confined between the clamp lips 14 and 15 of the bearing. An oil duct 19 is formed longitudinally in the pitman and communicates with the bushing, there being a lubricant cup 20 threaded through the side of the pitman and communicating with the duct to supply the lubricant thereto. A lag screw 21 is threaded through the side of the pitman and projects across the duct in the rear of the lubricant cup and forms a closure at this point in the duct. The bushing 17 being formed of leather will not wear the wrist pin as would the usual metal bushings, and furthermore, wear upon this bushing may be taken up when necessary by simply tightening the clamp bolt 16.

From the above description it will be seen that I have provided an extremely simple, light, and strong pitman that will be formed of a few parts that will not easily get out of order.

What is claimed, is:—

A pitman including an integral clamping element, a movable clamping element hinged at one end to the adjacent end of said integral element, said integral and movable elements having their opposed faces concaved to provide a bearing seat and their other ends terminating in parallel lips provided with registering openings, a flexible strap bearing arranged within the concavities of said elements with its ends directed between said lips and apertured to register with the openings in the latter, and a clamping bolt engaged through the lips and strap to operate said clamping elements and hold said strap against lateral displacement.

In testimony whereof, I affix my signature, in the presence of two witnesses.

BENJAMIN T. LANE.

Witnesses:
O. A. WELCH,
R. W. PHILLIPS.